(12) United States Patent
Webb et al.

(10) Patent No.: US 8,239,197 B2
(45) Date of Patent: Aug. 7, 2012

(54) EFFICIENT CONVERSION OF VOICE MESSAGES INTO TEXT

(75) Inventors: Mike O. Webb, Seattle, WA (US);
Bruce J. Peterson, Kirkland, WA (US);
Janet S. Kaseda, Kirkland, WA (US)

(73) Assignee: Intellisist, Inc., Bellevue, WA (US)

( * ) Notice: Subject to any disclaimer, the term of this patent is extended or adjusted under 35 U.S.C. 154(b) by 949 days.

(21) Appl. No.: 12/260,923

(22) Filed: Oct. 29, 2008

(65) Prior Publication Data

US 2009/0052636 A1 Feb. 26, 2009

Related U.S. Application Data

(60) Continuation-in-part of application No. 11/680,024, filed on Feb. 28, 2007, now Pat. No. 8,032,373, which is a division of application No. 10/403,350, filed on Mar. 27, 2003, now Pat. No. 7,330,538.

(60) Provisional application No. 60/368,644, filed on Mar. 28, 2002.

(51) Int. Cl.
*G10L 15/00* (2006.01)
*G10L 21/00* (2006.01)
*H04M 1/64* (2006.01)
*H04M 11/00* (2006.01)
*G06F 19/00* (2011.01)

(52) U.S. Cl. ........ 704/235; 704/231; 704/239; 704/251; 704/254; 704/270; 704/275; 379/88.01; 379/88.04; 379/88.08; 379/88.16; 379/88.22; 700/99; 700/100; 700/101; 700/103; 700/108; 700/109; 700/110; 700/111

(58) Field of Classification Search .................. 704/231, 704/235, 239, 251, 254, 270, 275; 379/88.01–88.28; 700/99–111
See application file for complete search history.

(56) References Cited

U.S. PATENT DOCUMENTS

| | | | |
|---|---|---|---|
| 3,937,889 A | 2/1976 | Bell, III et al. | 370/494 |
| 3,978,288 A | 8/1976 | Bruckner et al. | 380/253 |
| 4,060,694 A | 11/1977 | Suzuki et al. | 704/252 |
| 4,071,888 A | 1/1978 | Owens | 704/258 |
| 4,117,263 A | 9/1978 | Yeh | 704/267 |
| 4,196,311 A | 4/1980 | Hoven | 370/458 |
| 4,327,251 A | 4/1982 | Fomenko et al. | 704/270 |
| 4,612,416 A | 9/1986 | Emerson et al. | 379/88.18 |
| 4,790,003 A | 12/1988 | Kepley et al. | 379/88.18 |
| 4,837,798 A | 6/1989 | Cohen et al. | 379/88.14 |
| 4,935,954 A | 6/1990 | Thompson et al. | 379/88.04 |
| 5,299,240 A | 3/1994 | Iwahashi et al. | 375/240 |
| 5,528,728 A | 6/1996 | Matsuura et al. | 704/232 |
| 5,687,220 A * | 11/1997 | Finnigan | 379/88.22 |

(Continued)

*Primary Examiner* — Paras Shah
(74) *Attorney, Agent, or Firm* — Patrick J. S. Inouye; Krista A. Wittman

(57) ABSTRACT

A system and method for efficiently transcribing verbal messages transmitted over the Internet (or other network) into text. The verbal messages are initially checked to ensure that they are in a valid format and include a return network address, and if so, are processed either as whole verbal messages or split into segments. These whole verbal messages and segments are processed by an automated speech recognition (ASR) program, which produces automatically recognized text. The automatically recognized text messages or segments are assigned to selected workbenches for manual editing and transcription, producing edited text. The segments of edited text are reassembled to produce whole edited text messages, undergo post processing to correct minor errors and output as an email, an SMS message, a file, or an input to a program. The automatically recognized text and manual edits thereof are returned as feedback to the ASR program to improve its accuracy.

31 Claims, 11 Drawing Sheets

U.S. PATENT DOCUMENTS

| | | | | |
|---|---|---|---|---|
| 5,822,405 | A | 10/1998 | Astarabadi | 379/88.04 |
| 5,915,001 | A | 6/1999 | Uppaluru | 379/88.22 |
| 6,052,442 | A | 4/2000 | Cooper et al. | 379/88.19 |
| 6,088,428 | A | 7/2000 | Trandal et al. | 379/88.02 |
| 6,157,705 | A | 12/2000 | Perrone | 379/88.01 |
| 6,173,042 | B1 | 1/2001 | Wu | 379/88.04 |
| 6,208,966 | B1 | 3/2001 | Bulfer | 704/251 |
| 6,263,052 | B1 | 7/2001 | Cruze | 379/88.18 |
| 6,295,341 | B1 | 9/2001 | Muller | 379/88.18 |
| 6,321,194 | B1 | 11/2001 | Berestesky | 704/232 |
| 6,324,499 | B1 | 11/2001 | Lewis et al. | 704/233 |
| 6,327,345 | B1 | 12/2001 | Jordan | 379/88.02 |
| 6,330,308 | B1 | 12/2001 | Cheston, III et al. | 379/88.04 |
| 6,335,962 | B1 | 1/2002 | Ali et al. | 379/88.11 |
| 6,335,963 | B1 | 1/2002 | Bosco | 379/88.12 |
| 6,337,977 | B1 | 1/2002 | Ranta | 455/413 |
| 6,339,591 | B1 | 1/2002 | Migimatsu | 370/352 |
| 6,341,160 | B2 | 1/2002 | Tverskoy et al. | 379/88.13 |
| 6,341,264 | B1 | 1/2002 | Kuhn et al. | 704/255 |
| 6,345,250 | B1 | 2/2002 | Martin | 704/260 |
| 6,345,254 | B1 | 2/2002 | Lewis et al. | 704/275 |
| 6,347,134 | B1 | 2/2002 | Sherwood et al. | |
| 6,366,882 | B1 * | 4/2002 | Bijl et al. | 704/235 |
| 6,442,242 | B1 | 8/2002 | McAllister et al. | 379/67.1 |
| 6,453,252 | B1 | 9/2002 | Laroche | |
| 6,487,278 | B1 | 11/2002 | Skladman et al. | 379/88.13 |
| 6,687,339 | B2 * | 2/2004 | Martin | 379/88.14 |
| 6,724,867 | B1 | 4/2004 | Henderson | 379/88.22 |
| 6,748,360 | B2 | 6/2004 | Pitman et al. | |
| 6,973,426 | B1 | 12/2005 | Schier et al. | |
| 7,006,967 | B1 * | 2/2006 | Kahn et al. | 704/235 |
| 7,010,485 | B1 | 3/2006 | Baumgartner et al. | |
| 7,016,844 | B2 * | 3/2006 | Othmer et al. | 704/270.1 |
| 7,024,359 | B2 * | 4/2006 | Chang et al. | 704/251 |
| 7,170,979 | B1 | 1/2007 | Byrne et al. | 379/88.18 |
| 7,184,539 | B2 * | 2/2007 | Colson et al. | 379/265.01 |
| 7,184,957 | B2 * | 2/2007 | Brookes et al. | 704/246 |
| 7,194,752 | B1 | 3/2007 | Kenyon et al. | |
| 7,236,932 | B1 * | 6/2007 | Grajski | 704/277 |
| 7,292,975 | B2 * | 11/2007 | Lovance et al. | 704/235 |
| 7,321,852 | B2 * | 1/2008 | Stanford | 704/235 |
| 7,562,012 | B1 | 7/2009 | Wold et al. | |
| 7,668,710 | B2 * | 2/2010 | Doyle | 704/9 |
| 7,672,843 | B2 | 3/2010 | Srinivasan et al. | |
| 7,698,140 | B2 * | 4/2010 | Bhardwaj et al. | 704/260 |
| 7,836,412 | B1 * | 11/2010 | Zimmerman | 715/827 |
| 2002/0178004 | A1 | 11/2002 | Chang et al. | |
| 2003/0115045 | A1 | 6/2003 | Harris et al. | |
| 2004/0204941 | A1 * | 10/2004 | Israch et al. | 704/240 |
| 2005/0102140 | A1 * | 5/2005 | Davne et al. | 704/235 |
| 2007/0117544 | A1 | 5/2007 | Doulton | 455/413 |
| 2008/0154870 | A1 | 6/2008 | Evermann et al. | 707/4 |
| 2009/0006085 | A1 * | 1/2009 | Horvitz et al. | 704/223 |
| 2009/0204400 | A1 * | 8/2009 | Shields et al. | 704/246 |

* cited by examiner

EFFICIENT CONVERSION OF VOICE MESSAGES INTO TEXT

RELATED APPLICATIONS

This application is a continuation-in-part of a patent application Ser. No. 11/680,024, filed on Feb. 28, 2007, and now issued as U.S. Pat. No. 8,032,373 on Oct. 4, 2011, which is a divisional application of patent application Ser. No. 10/403,350, filed on Mar. 27, 2003 and now issued as U.S. Pat. No. 7,330,538 on Feb. 12, 2008, which was based on provisional patent application Ser. No. 60/368,644, filed on Mar. 28, 2002, the benefit of the filing dates of which is hereby claimed under 35 U.S.C. §119(e), and under 35 U.S.C. §120.

BACKGROUND

People typically communicate with each other either verbally, e.g., in face-to-face conversations or via some form of telephone/radio; or, in written messages. Traditionally, written communications have been in the form of hand written or typed notes and letters. More recently, the Internet has made communication by chat and email messages a preferred form of communication.

Telephone systems are designed to convey audio signals that facilitate verbal communications. However, since the recipient of a telephone call is often not available to receive it, voice mail systems have been developed to record verbal messages so that they that can be heard by the intended recipient at a later time. Periodically, the intended recipient can access their voice mail system via telephone or cell phone to hear the voice mail messages recorded from telephone calls that they missed receiving. However, a person may need to access several different voice mail accounts at different times during a day. For example, it is not unusual to have a voice mail account for a cell phone, another for a home phone, and yet another for an office phone.

For many people, it would be more convenient to receive all communications in text format rather than having to repeatedly access verbal messages stored in different locations. In regard to receiving the communications stored as verbal messages in multiple voice mail accounts, it would thus be easier for a person to receive emails or other forms of text messages that convey the content of the verbal messages, since it would then not be necessary for the person to call a voice mail account, and enter the appropriate codes and passwords to access the content of those accounts. Accordingly, it would be desirable to provide an efficient and at least semi-automated mechanism for transcribing verbal messages to text, so that the text can be provided to an intended recipient (or to a program or application programming interface (API) that uses the text). This procedure and system need not be limited only to transcribing voice mail messages, but could be applied for transcribing almost any form of verbal communication to a corresponding text. Ideally, the system should function so efficiently that the text message transcription is available for use within only a few minutes of the verbal message being submitted for transcription.

One approach that might be applied to solve this problem would use fully automated speech recognition (ASR) systems to process any voice or verbal message in order to produce corresponding text. However, even though the accuracy of an ASR program such as Nuance's Dragon Dictate™ program has dramatically improved compared to the earlier versions when trained to recognize the characteristics of a specific speaker's speech patterns, such programs still have a relatively high error rate when attempting to recognize speech produced by a person for which the system has not been trained. The accuracy is particularly poor when the speech is not clearly pronounced or if the speaker has a pronounced accent. Accordingly, it is currently generally not possible to solely rely on an automated speech recognition program to provide the transcription to solve the problem noted above.

Furthermore, if a service is employed to provide the transcription of verbal messages to text, the queuing of the verbal messages to be transcribed should be efficient and scalable so as to handle a varying demand for the service. The number of verbal messages that a service of this type would be required to transcribe is likely to vary considerably at different times of the day and during week days compared to weekends. This type of service can be relatively labor intensive since the transcription cannot be provided solely by automated computer programs. Accordingly, the system that provides this type of service must be capable of responding to varying demand levels in an effective and labor efficient manner. If overloaded with a higher demand for transcription than the number of transcribers then employed can provide, the system must provide some effective manner in which to balance quality and turnaround time to meet the high demand, so that the system does not completely fail or become unacceptably backlogged. Since a service that uses only manual transcription would be too slow and have too high a labor cost, it would be desirable to use both ASR and manual transcription, to ensure that the text produced is of acceptable quality, with minimal errors.

It has been recognized that specific portions of verbal messages tend to be easier to understand than other portions. For example, the initial part of a verbal message and the closing of the message are often spoken more rapidly than the main body of the message, since the user puts more thought into the composition of the main body of the message. Accordingly, ASR of the rapidly spoken opening and closing portions of a verbal message may result in higher errors in those parts of the message, but fewer errors than the main body of the verbal message. It would be desirable to use a system that takes such considerations into effect when determining the portion of the message on which to apply manual editing or transcription, and to provide some automated approach for determining which portions of a message should be manually transcribed relative to those portions that might be acceptable if only automatically transcribed by an ASR program.

SUMMARY

In consideration of the preceding discussion, an exemplary method has been developed for transcribing verbal messages into text. This method includes the steps of receiving verbal messages over a network and queuing the verbal messages in a queue for processing into text. At least portions of successive verbal messages from the queue are automatically processed with online processors using an automated speech recognition program (ASR) to produce corresponding text. Whole verbal messages or segments of the verbal messages that have been automatically processed are assigned to selected workbench stations for further editing and transcription by operators using the workbench stations. The operators at the workbench stations to which the whole or the segments of the verbal messages have been assigned can listen to the verbal messages, correct errors in the text that was produced by the automatic processing, and transcribe portions of the verbal messages that have not been automatically processed by the ASR program. The resulting product comprises final text messages or segments of final text messages corresponding to the verbal messages that were in the queue. Segments of the text messages produced by the operators at the workbench stations are assembled from the segments of the verbal messages that were processed and, along with whole text messages corresponding to the whole verbal messages that were processed, are used to provide final output text messages.

The method further includes the step of validating a format of the verbal message and a return address that can be used for delivery of an output text message, before enabling queuing of each verbal message to be transcribed.

Verbal messages can be assigned to specific online processors in accord with predefined assignment rules, so that the online processor used is appropriate to automatically transcribe the type of verbal message assigned to it. Whole verbal messages can be simultaneously sent to the online processors for processing using the ASR program and to a queue for processing by an operator at one of the workbench stations.

Audio content in a verbal message can be separated from associated metadata. The associated metadata can include one or more elements such as proper nouns, and if the verbal message is a voice mail can include the caller's name, and the name of the person being called. Both the audio content and the metadata for the verbal messages in the queue can be input to the online processors for improving accuracy of the ASR program.

The step of automatically processing can include the steps of checking for common content patterns in the verbal messages to aid in automated speech recognition; and checking automatically recognized speech using a pattern matching technique to identify any common message formats.

The method can further include the step of breaking up at least some of the verbal messages into the segments based on predefined rules. For example, the verbal message can be broken into the segments at points where silence is detected, such as between words or phrases, and the segments can be required to have a predefined maximum duration. Also, the segments can be selected so that they have between a predefined minimum and a predefined maximum number of words. Confidence ratings can be assigned to the segments of the verbal messages that were automatically recognized by the ASR program. Then, the verbal message, the automatically recognized text, a timeline for the verbal message, and the confidence ratings of the segments can be input to a workbench partial message queue. Furthermore, segments that have a confidence rating above a predefined level can be withheld from the workbench partial message queue, based on a high probability that the automatically recognized text is correct and does not require manual editing.

The step of assigning whole verbal messages or segments of verbal messages can include the steps of assigning the whole verbal messages or the segments of verbal messages to a specific workbench station used by an operator who is eligible to process verbal messages of that type. Also, segments of verbal messages having a lower quality can be assigned to workbench stations first, to ensure that such segments are transcribed with a highest quality, in a time allotted to process each of the verbal messages.

The operators at the workbench stations can edit and control transcription of the verbal messages in a browsing program display. Transcription of the whole verbal messages can be selectively carried out in one of three modes, including a word mode that includes keyboard inputs for specific transcription inputs, a line mode that facilitates looping through an audible portion of the verbal message to focus on a single line of transcribed text at a time, and a whole message mode, in which the operator working at the workbench station listens to the whole verbal message so that it can be transcribed to produce the corresponding text. Transcription of parts of a verbal message is carried out by an operator at a workbench station viewing a display of a graphical representation of an audio waveform for at least a part of the verbal message. A segment to be transcribed can be visually indicated in this displayed graphical representation.

The method can further include the step of applying post processing to text corresponding to the verbal messages that were transcribed, in order to correct minor errors in the text.

If it appears that editing the automatically produced text for a whole verbal message by an operator on a workbench station will exceed a required turn-around-time, the method can include the step of immediately post processing the automatically produced text without using any edits provided by any operator at a workbench station. Further, if it appears that editing parts of the verbal message will exceed the required turn-around-time, the method can include the step of post processing any text of the verbal message that was automatically recognized and has a confidence rating that is greater than a predefined minimum, along with any segments of the verbal message that have already been edited or transcribed by an operator on a workbench station, and any text of the verbal message that was automatically recognized and was moved into a workbench station queue but has not yet been edited by an operator at a workbench station.

The step of producing final output text messages can include the steps of making the final output text messages available to an end user by transmitting the final output text messages to the end user in connection with an email message transmitted over the network, a short message service (SMS) message transmitted over the network and through a telephone system, a file transmitted over the network to a program interface, and a file transmitted over the network to a web portal.

The method can also include the step of employing edits made to text that was produced by the ASR program by operators at the workbench stations as feedback. This feedback will then be used to improve an accuracy of the ASR program.

Another aspect of the present novel approach is directed to a system for efficiently transcribing verbal messages that are provided to the system over a network, to produce corresponding text. The system includes a plurality of processors coupled to the network, for receiving and processing verbal messages to be transcribed to text. These processor implement functions that are generally consistent with the steps of the method discussed above.

This application specifically incorporates by reference the disclosures and drawings of each patent application and issued patent identified above as a related application.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figure 1:
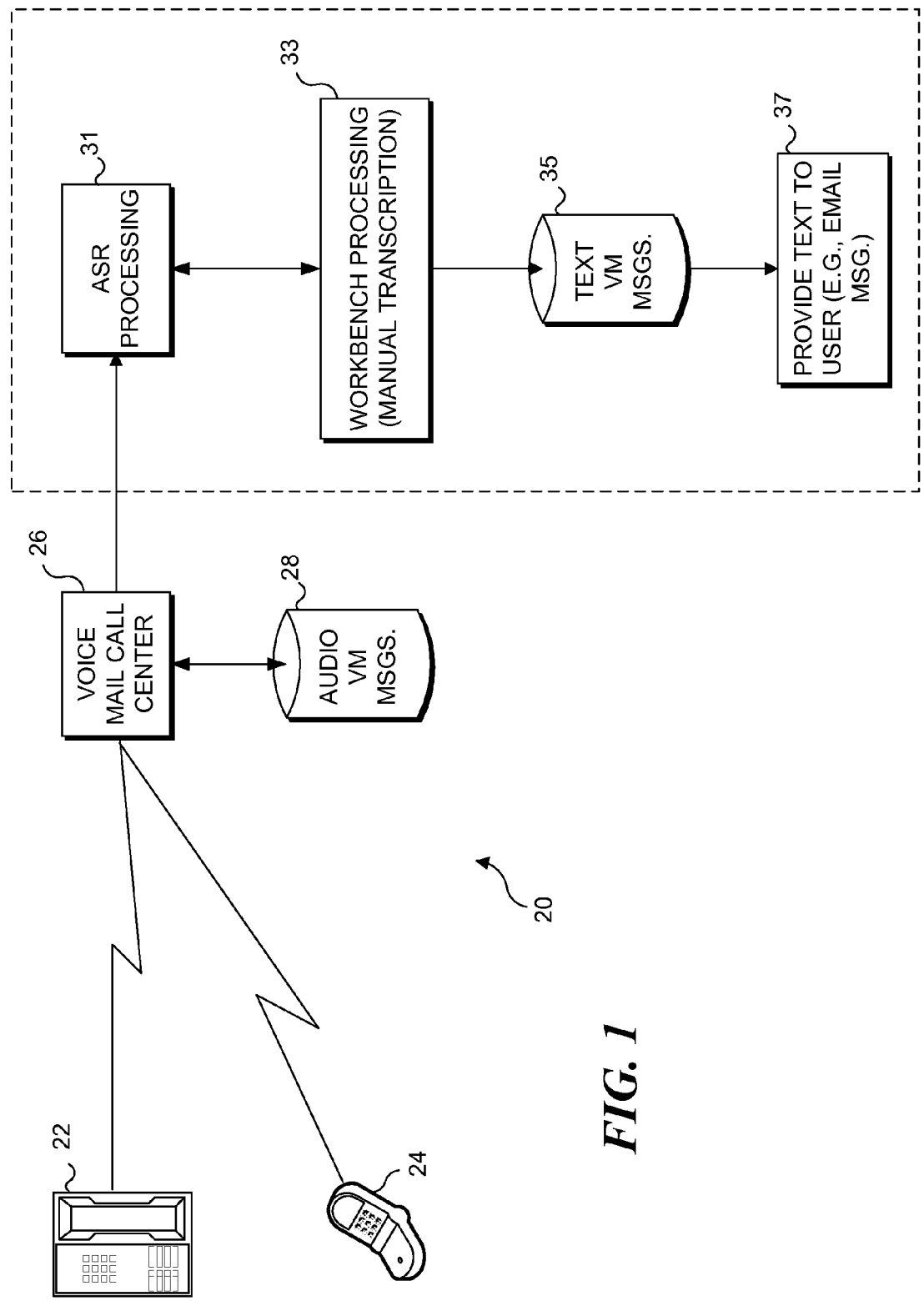
FIG. 1 is a simplified block diagram showing exemplary elements of one application of a system in accord with the present approach, for efficiently transcribing verbal (voice mail) messages to text.

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Overview of Exemplary Application for Transcription Service

FIG. 1 illustrates a functional block diagram 20 showing an exemplary application of the present novel approach for efficiently transcribing verbal messages to text. This exemplary application is directed to use of this technology for transcribing voice mail messages, although it is not intended that the technology be in any way limited to that specific application. In the simple illustration of FIG. 1, conventional telephones 22 and 24 are employed at different times by two parties attempting to place a telephone call to an intended recipient. In each case, the intended recipient is unavailable to take the call, either because the person is away from a telephone to which the calls are placed, or because the intended recipient is already talking on that telephone to a different party.

As is often the case, the intended recipient may actually have multiple voice mail systems to receive calls directed to different telephones; however, in this simple example, the intended recipient uses a single voice mail call center 26 to receive telephone calls that fail to reach that person when placed to one or more telephones used by the person. Furthermore, in this example, the intended recipient prefers to receive text transcriptions of any voice mail messages received by voice mail call center 26, which are recorded in a data store 28. To satisfy the requirement of this customer and others to receive corresponding text messages instead of checking one or more voice mail stores, the voice mail call center transmits the voice mail messages for the person to a service (as shown within the dash-line rectangle) that makes use of the present novel approach to produce corresponding text. The voice mail messages are input for automated speech recognition (ASR) processing, as indicated in a block 31, producing automatically recognized text corresponding to a least a portion of the voice mail messages submitted to the service for transcription. The voice mail messages and the text that has been automatically recognized are then provided to one or more workbench stations for additional processing by a human agent, in a block 33. The additional processing by human operators manning each workbench includes editing of the automatically recognized text, and/or further manual transcription of any portions of the voice mail messages that have not been automatically recognized during the ASR processing. The resulting text produced using the one or more workbench stations is stored in data storage 35 and then subsequently provided to the person who was the intended recipient of the voice mail messages that have been transcribed (or to a software program), as indicated in a block 37.

Figure 2:
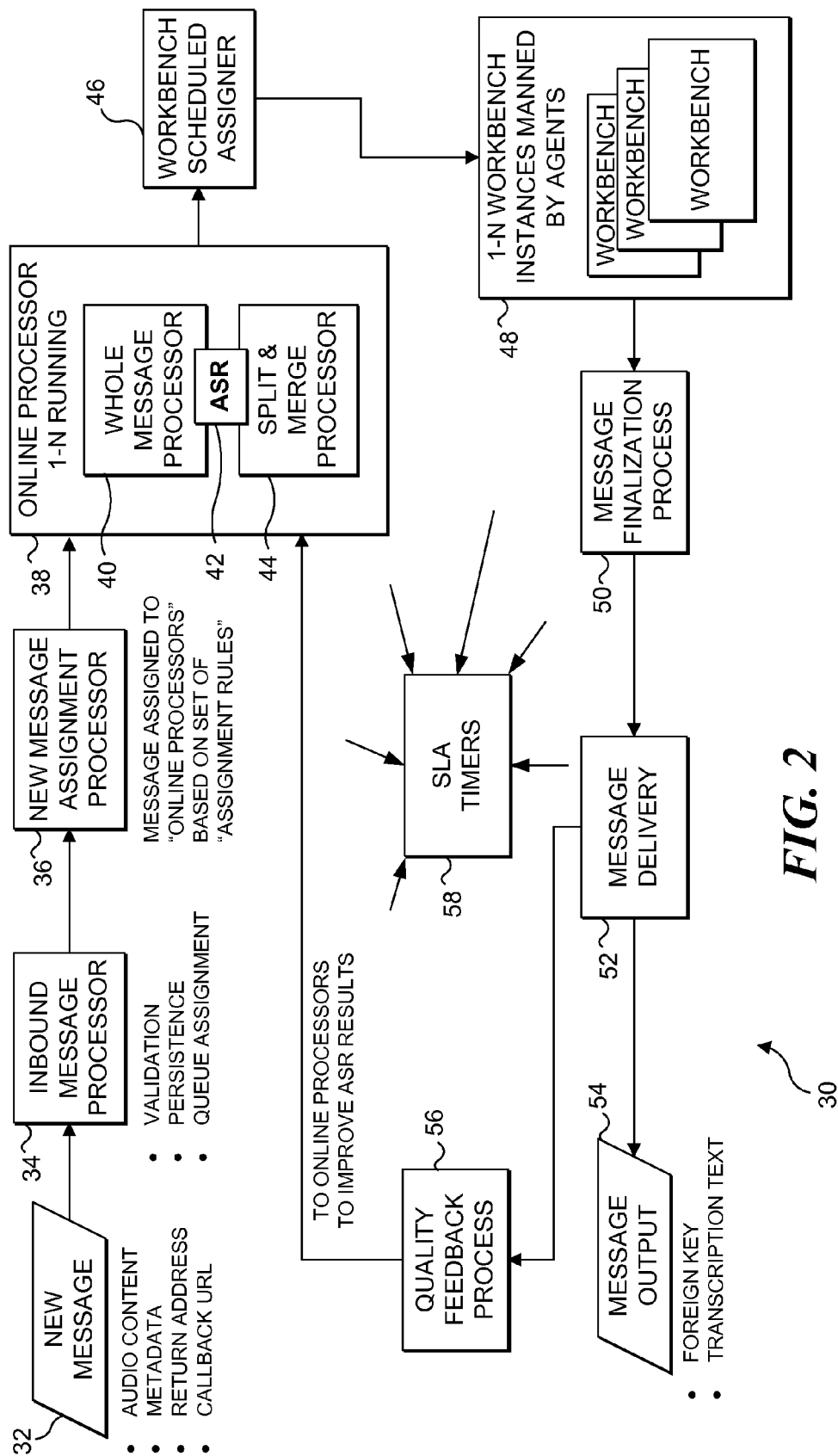
FIG. 2 is an overview functional flowchart showing exemplary steps for processing verbal messages and transcribing them to produce corresponding text messages.

FIG. 2 is a functional block diagram 30 illustrating further details of an exemplary method and system in accord with the present novel approach for efficiently transcribing verbal messages to text and represents a general overview that starts with a new verbal message 32 being received for transcription into text by the system. New verbal message 32 includes both audio content in the form of an audio file, and metadata related to the verbal message. The metadata can include proper nouns associated with the message and, if the verbal message is a voice mail message, the metadata would include the name of the calling party, and the name of the person who was called. Also, since the text corresponding to the verbal message must be transmitted to an end user, each new verbal message that is received should include a callback network address or uniform resource locator (URL), to which the text should be directed after the verbal message has been transcribed by the service.

New verbal messages 32 are input to an inbound message processor 34, which validates each new verbal message, as described in greater detail below. After a verbal message is validated, it is input to a new message assignment processor 36, which assigns the verbal messages to specific online processors 38, based on a set of "assignment rules." The servers will normally include one or more online processors that are used for the ASR processing.

The verbal messages are handled in two different ways to carry out the ASR processing. In some cases, whole verbal messages are processed by the ASR software program, producing automatically recognized text for the entire message. In other cases, the verbal message is split into parts, and only some of the parts may be automatically recognized by the ASR software program. The verbal messages that were input to the online processors and the automatically recognized text produced by the ASR software program are then output to a workbench scheduled assigner 46, which places these materials into a workbench queue.

The workbench queue provides input to one or more workbench stations 48 that are used by human agents. As noted above, these human agents review the automatically recognized text, editing it to correct errors, and also manually transcribe any portions of the verbal messages that were not automatically recognized. For those messages that were split into parts, portions of a message may be processed by a plurality of human agents at different workbenches, and the text produced by those agents is then reassembled to produce an overall text message corresponding to the original verbal message that was split into parts.

The output from the one or more workbench stations is input to a message finalization process 50. The finalization process corrects typographical and spelling errors in the text, producing output text that is input to a message delivery block 52, which prepares the text for delivery to an end user or software program that will use the text, as indicated in a message output block 54. In addition, message delivery block 52 also provides the original verbal message and all of the edits made by human agents manning the one or more workbenches as feedback to a quality feedback process 56 so that the ASR software program can improve its speech recognition accuracy to correct the errors noted by the human agents in the automatically recognized text previously produced by the ASR program.

The service providing the transcription of verbal messages to text may be required to commit to providing transcribed text for each verbal message received by the service within a specific time limit. If so, a service level agreement (SLA) might impose penalties (monetary) for delays in completing the transcription of verbal messages to text. Accordingly, FIG. 2 includes SLA timers 58, which are employed to determine if the service is meeting the transcription time limits agreed to in the contracts with parties subscribing to the service. Further details regarding SLA timers 58 and each of the other blocks shown in FIG. 2 are discussed below.

Further Details of the Exemplary Method and System

Figure 3:
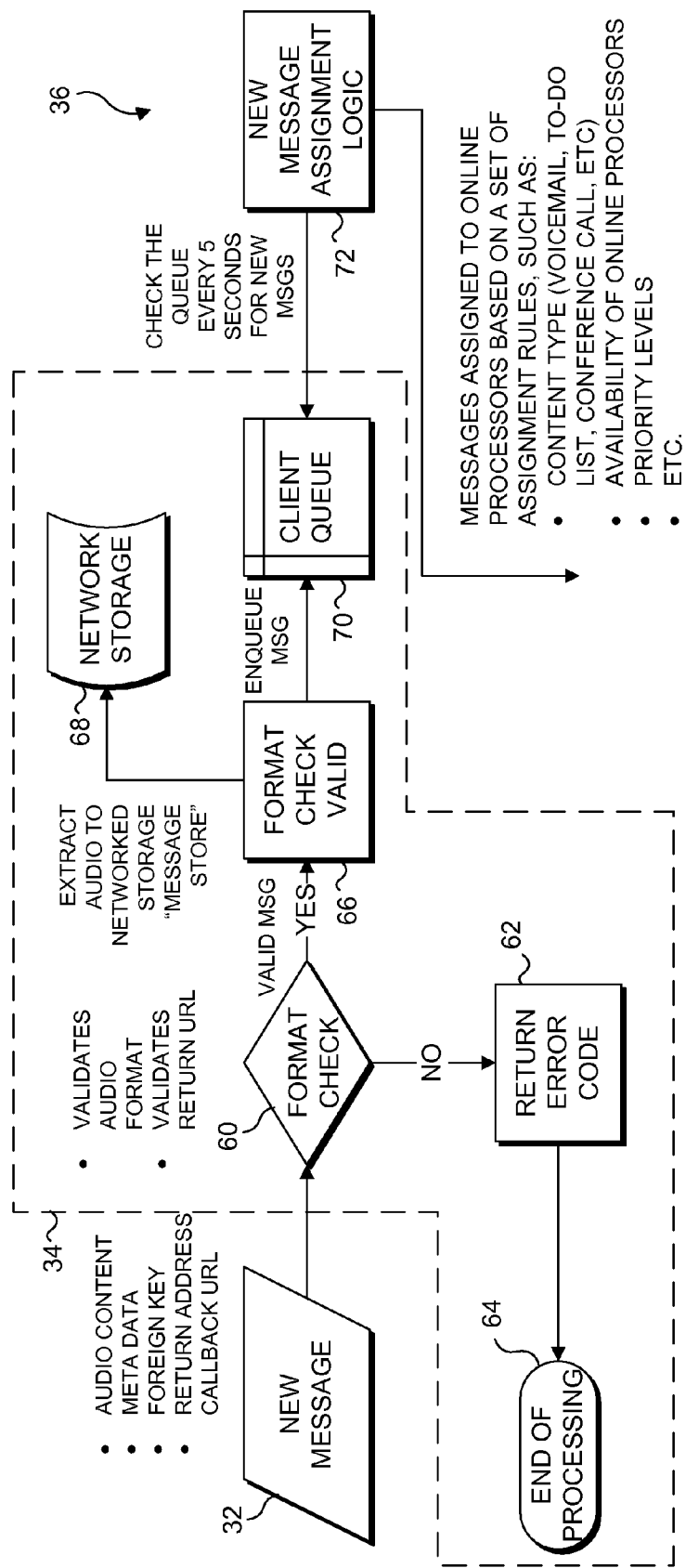
FIG. 3 is a functional flowchart showing exemplary steps for processing inbound verbal messages.

The functions carried out by inbound message processor 34 are illustrated in FIG. 3. When processing new verbal messages 32, inbound message processor 34 validates the audio format of the audio content portion of the verbal message in a decision step 60. If the format of the audio content is invalid, a step 62 provides for returning an error code, which then terminates further processing of that verbal message in a step 64. However, if the message format is valid, as indicated in a step 66, the audio content that has been extracted is stored in a networked storage 68. Also, the verbal message is queued in a client queue 70 to await further processing. Verbal messages are processed from client queue 70 at a step 72, which carries out new message assignment logic, checking the queue for new verbal messages, for example, every five seconds.

The new message assignment logic assigns verbal messages to the online processors based on a predefined set of assignment rules. For example, the assignment rules can select an online processor for processing a verbal message based upon the type of content, e.g., voice mail, a to do list, a conference call, etc., a priority level of the verbal messages, and other criteria, as appropriate.

Figure 4:
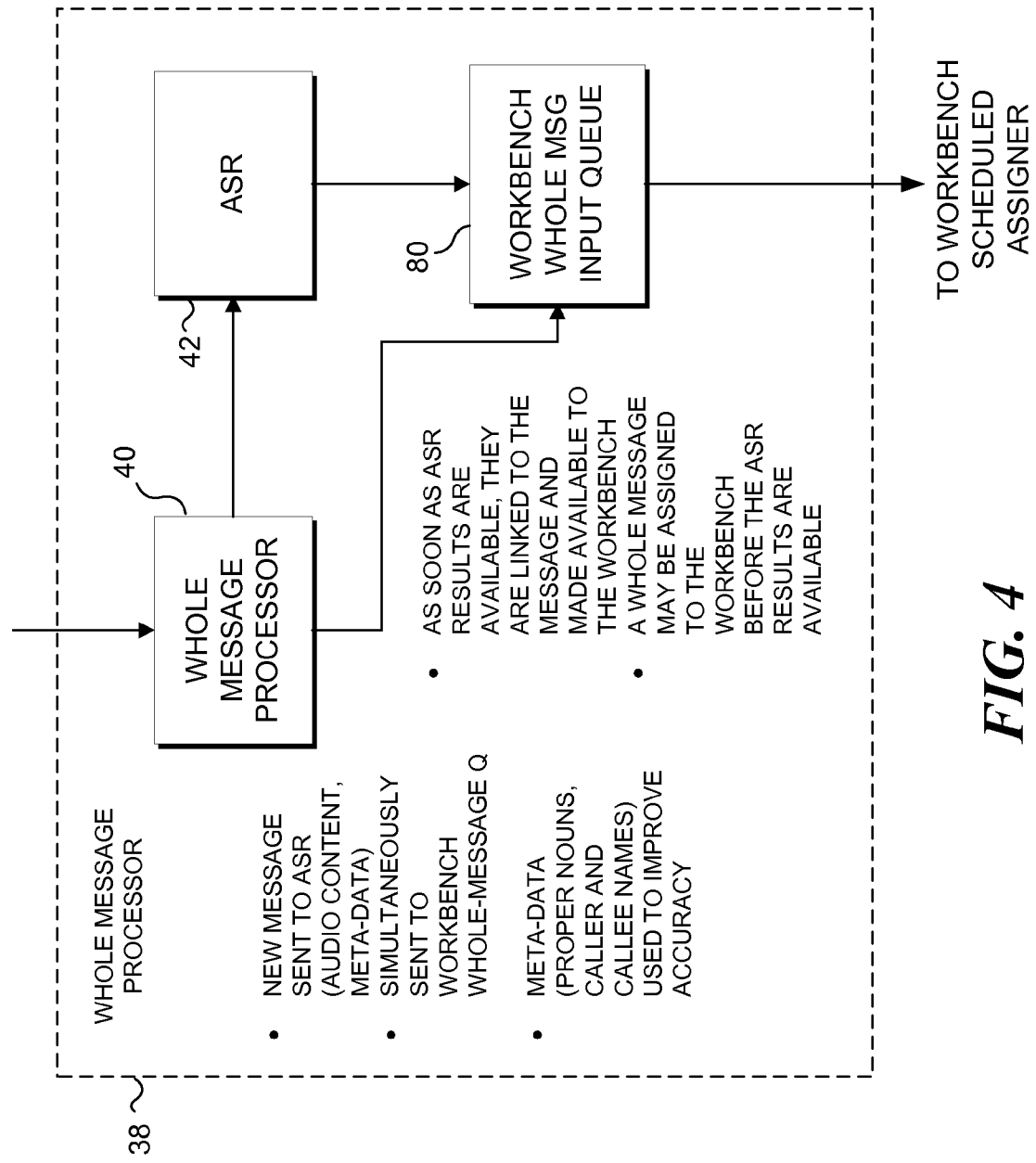
FIG. 4 illustrates exemplary details of the whole message processor from FIG. 2.

FIG. 4 illustrates further details of the steps carried out by whole message processor 40, which implements one set of functions of online processors 38. The whole message processor sends a new verbal message, which includes the audio content and metadata, to ASR program 42. As noted above, the metadata includes proper nouns, and may include the caller and person being called in regard to voice mail messages. The metadata are used to improve the accuracy of the ASR process.

Simultaneously, whole message processor 40 sends the new verbal message to a workbench whole message input queue 80. As soon as the ASR process has completed automatic recognition of the verbal text, the results are linked to the verbal message within the workbench whole message input queue and together, the results and corresponding verbal message are made available to a workbench station used by an agent for processing the whole verbal message. It should be noted that a whole message may sometimes be assigned to an agent at a workbench station before the automatically recognized text from the ASR processing is available, to avoid delaying the processing of a verbal message. Workbench whole message queue 80 is made available to the workbench scheduled assigner to facilitate further manual processing, as discussed below.

Figure 5:
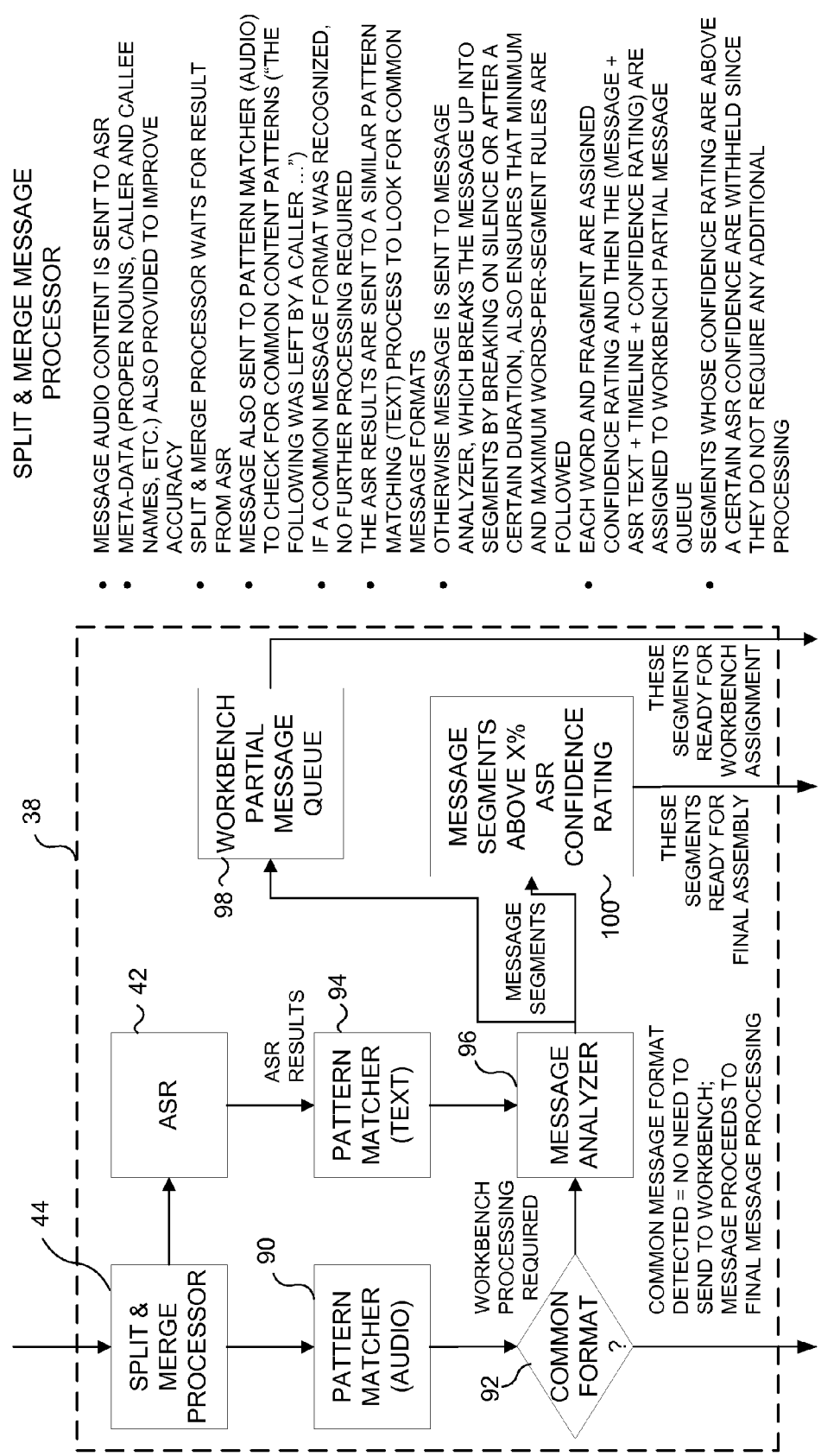
FIG. 5 is a functional flowchart showing exemplary steps implemented by the split and merge processor of FIG. 2.

Split and merge processor 44, which is included in online processors 38, sends the audio content from a verbal message to ASR 42 and also to a pattern matcher 90 (as shown in FIG. 5), which looks for patterns in the audio content. A decision step 92 determines if any common formats have been detected within the audio content portion of the verbal message, such as common patterns corresponding to frequently used phrases or sentences. For example, a verbal message might include the common phrase "[T]he following was left by a caller . . . ," which would be more likely to be accurately recognized. In the event that a common message format is detected within the audio content, there is no need to send that portion of the audio content to the workbench for further manual processing by a human agent. Instead, that portion of the message is input to final message processing. However, the split and merge message processor sends other portions of a verbal message that do not match that of a common message format to a message analyzer 96. Similarly, ASR processing 42 produces automatically recognized text results that are input to a pattern matcher 94, which looks for commonly used text patterns. Message analyzer 96 breaks up the message into segments at points in the message where there is silence, or after a specified duration of time. This step also ensures that a minimum and maximum number of words are included per segment, in accord with predefined rules.

Each word and fragment input to the message analyzer is assigned a confidence rating. Next, the message analyzer supplies: (a) the verbal message; (b) the automatically recognized text provided by the ASR process; (c) a timeline for processing the verbal message; and, (d) the confidence rating that was assigned to automatically recognized portions of the message—all to a workbench partial message queue 98. Segments that were automatically recognized by the ASR and have a confidence rating above a certain predefined level are withheld from the workbench partial message queue, as indicated in a step 100, since they do not require any additional processing by a human agent and can instead be output for final assembly into a text message corresponding to the verbal message from which the segments were derived. The segments that were input to workbench partial message queue 98 are now ready for assignment to a workbench station for further manual editing and/or transcription by a human agent.

Figure 6:
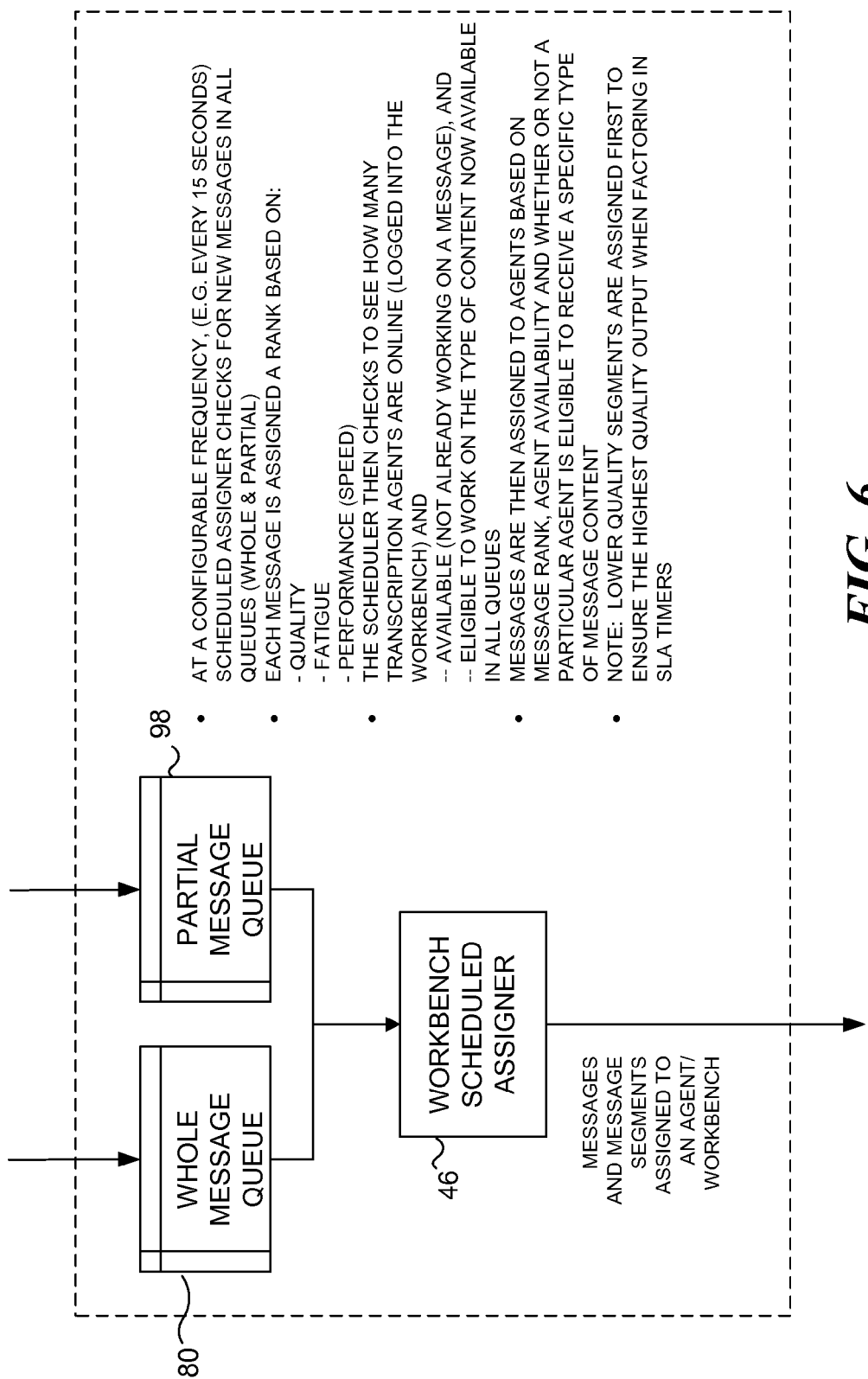
FIG. 6 is a functional flowchart showing exemplary steps carried out by the workbench scheduler assigner of FIG. 2.

Further details relating to the functions carried out by workbench scheduled assigner 46 are illustrated in FIG. 6. Whole message queue 80 includes all of the messages that require editing and/or transcription by a human agent at a workbench station. Similarly, partial message queue 98 includes segments of messages that require editing and/or further processing by a human agent. At a predefined and configurable frequency, for example, every 15 seconds, workbench scheduled assigner 46 checks for new whole messages in whole message queue 80 and partial messages in partial message queue 98. Each message in these queues is assigned to a human agent according to a rank for the agent that is based on a quality, a fatigue factor, and a performance or speed. Quality, fatigue factor, and performance are attributes assigned to each transcription human agent, and are employed by the message assignment algorithm to determine which human agent will be assigned the verbal messages or parts of messages for editing/transcription. Quality is a measurement of the error rate of a human agent and is relatively static (since it isn't recalculated or updated frequently). Fatigue factor is a measure the amount of idle time a human agent has between messages (i.e., a greater amount of idle time corresponds to a lower fatigue factor) and is typically recalculated many times during a single shift of each human agent. Performance measures the agent's work rate, e.g., a determination of the time required for a human agent to edit/transcribe a predefined number of seconds of verbal message audio data. It will be understood that these criteria are only exemplary and many other criteria might instead be used for determining the human agent that is assigned messages from the queues to edit/transcribe.

Not only is the ASR processing useful for assisting the human agents in transcribing verbal messages, and for dividing up the verbal message into partial sections, it is also used for deciding the assignment order of the partial sections for editing and transcription by the human agents. In carrying out this function, the ASR processing ensures that difficult sections (i.e., sections having a low machine confidence level in regard to accurate automated transcription) are assigned to the human agents before easy ones. In addition, high-performing human agents are preferably selected before slower or lower-quality human agents in editing and transcribing the more difficult portions of verbal messages. ASR processing also assists the system to perform well (although, perhaps with a higher error level) when the verbal message volume being submitted for transcription exceeds the capability of the available human agents to process. Thus, if there is a spike in verbal message transcription traffic, the system does not bog down and fail to meet its operating requirements due to a backlog of work that is increasing faster than the transcription service can process it. Instead, the more difficult portions of the verbal messages that have been automatically recognized, but have the lowest machine confidence levels are assigned out to human agents for editing and transcription and the remainder of the verbal messages will be completed using the text automatically recognized by the ASR processing, but in a gradual fashion. Accordingly, the higher the system load requirements for transcribing verbal messages, the higher will be the percentage of the text messages that is produced by ASR processing.

The workbench scheduled assigner determines how many human agents are online at the workbench stations. It should be understood that agents can use a workbench station from a remote location that is accessed over a network, e.g., the Internet, and these human agents may be located in many diverse geographic locations throughout the world. The human agent who carries out the editing and transcription of messages using a workbench station must have an excellent understanding of the language in which the verbal messages are spoken, but that language need not be the native language of the agent. Considerable labor savings can be achieved by using agents located in certain portions of the world in which labor rates are relatively low, without adversely affecting the quality of the editing and transcription of messages provided by such agents.

When determining which agents might be used for processing a whole or partial message, the workbench scheduled assigner determines the agents who are not already working on a message and the agents who are eligible to work on the type of content now available in each of the queues. The messages, partial or whole, are assigned to the human agents based on the message rank, agent availability, and based upon whether a particular agent is eligible to receive a specific type of message content. For example, verbal messages of a technical nature should logically only be assigned to human agents who can understand a technical vocabulary. In making the assignment of partial or whole messages, workbench scheduled assigner 46 will generally assign message segments of lower quality to the agents first, to insure that the output produced by the agent processing that message is of the highest quality, particularly given the constraints in the time applied to transcribing each message when SLA timers 58 (FIG. 2) are in use.

Figure 7:
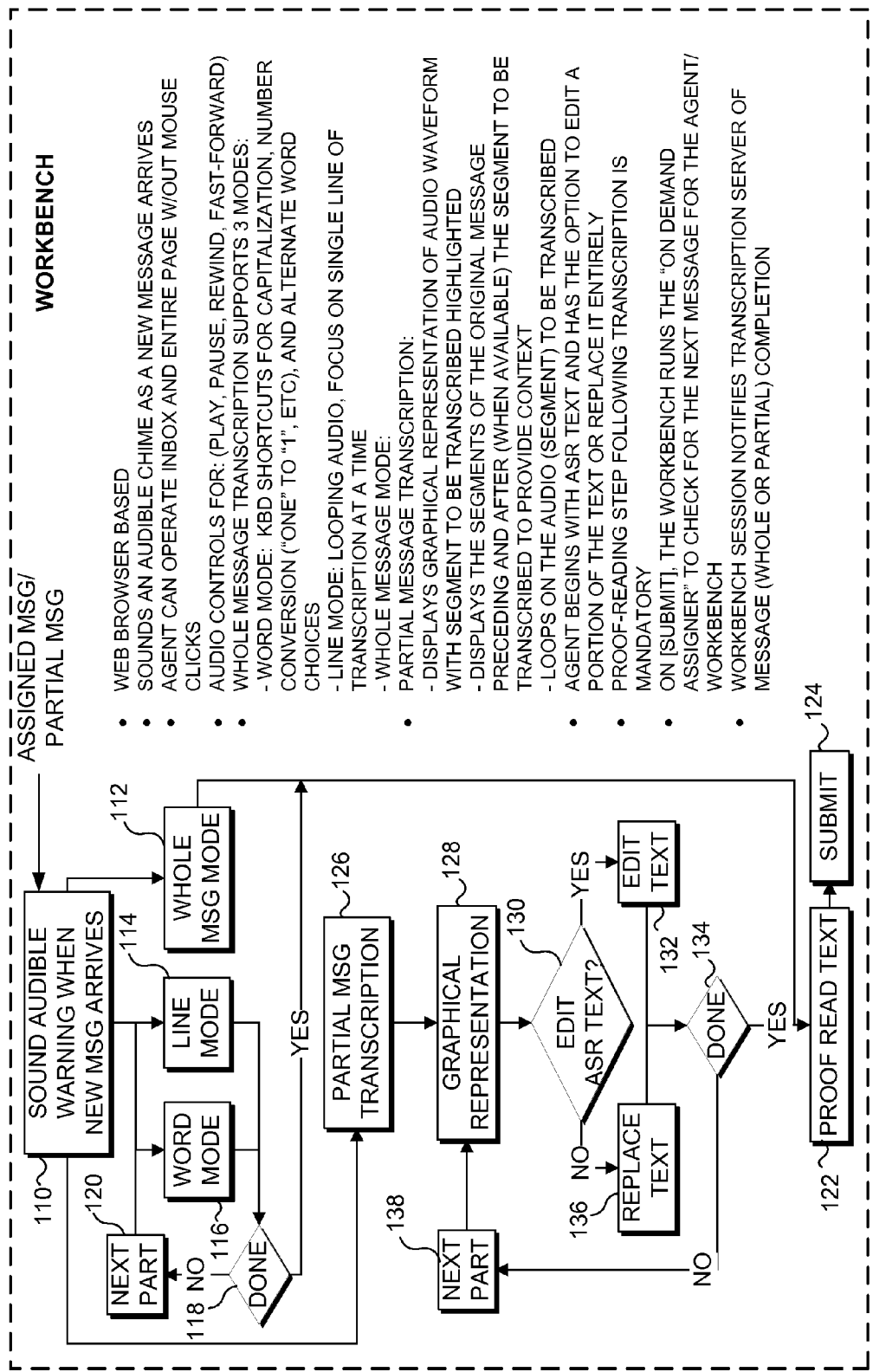
FIG. 7 is a functional flowchart showing exemplary steps carried out by one of the workbenches of FIG. 2.

The functions implemented by a human agent using a workbench station are illustrated in FIG. 7. In a step 110, the arrival of a whole or partial message that has been assigned to a specific workbench for manual processing causes an audible sound to be produced, e.g., the sound of a chime, to warn that a new message or portion of the message has just arrived. The workbench station comprises a web browser-based software program that enables a human agent to edit and transcribe whole or partial messages. The human agent is able to operate on a message within an inbox and process an entire page of text without using mouse clicks, since the browser program comprising the work bench station employs keyboard shortcuts. In addition, the workbench station program includes audio controls for playing, pausing, rewinding, and fast forwarding through a verbal message while the human agent transcribes it to produce corresponding text.

One of three different modes of transcription can be selected for a whole message, including a word mode 116 that includes shortcuts on the keyboard for capitalization, number conversion, and alternate word choices; a line mode 114 that provides for looping through the audio, enabling an agent to focus on a single line of transcription at a time when producing corresponding text; and, a whole message mode 112. Thus, when a whole message is received, the workbench station can selectively be used in whole message mode 112, line mode 114, or word mode 116. If used in whole message mode 112, the workbench station program enables the human agent to edit or transcribe the entire message, producing corresponding text, which is then input to a proofread text step 122, producing output that is submitted for transmission to an end user (or an application program). If either line mode 114 or word mode 116 is selected by the human agent, the agent can process the line or word, editing it or transcribing it. A decision step 118 then determines if the end of the message has been reached. If not, a step 120 enables the human agent to edit or transcribe the next part of the whole message in either the line or word mode.

If a partial message is received for processing by the human agent at the workbench station, a step 126 provides for partial message transcription. In this case, the workbench station program displays a graphical representation of the audio waveform comprising the partial verbal message, in a step 128. In this graphical representation, the segment that is to be transcribed by the agent is highlighted. In addition, segments preceding and following the highlighted segment currently being transcribed are also displayed (when available), to provide context to the current segment. When processing automatically recognized text produced by the ASR program, as shown in a decision step 130, the human agent has the option of editing that text in a step 132, or replacing it completely with manually transcribed text that the agent believes to be more accurate, in a step 136. A decision step 134 determines if the partial message transcription is completed and if not, proceeds to the next part of the partial message in a step 138, returning again to graphical representation step 128. Once the partial message has been fully transcribed (or edited), the process again proceeds with step 122. It should be noted that proofreading of either a whole message or of a partial message that has been edited and/or transcribed is mandatory before the text that is produced is submitted for delivery to the end user in step 124. Submission of the text produced by the agent also then causes the workbench scheduler assignor to check for the next message that is to be processed by the agent on the workbench station. Further, the workbench station notifies the transcription server when a whole or partial message has been completely edited and/or transcribed.

There is a clear advantage to employing a plurality of different human agents working at different workbench stations to simultaneously edit and/or transcribe different segments of a message, since the processing of a verbal message can be completed much more rapidly with such parallel processing. Further, by first processing the portions or segments of a verbal message that have been assigned a lower confidence rating, if insufficient time is available (within the constraints imposed by the SLA timers) to complete the processing of a message using the workbench stations, the human agents will be employed for processing only the more difficult portions of the message, thereby maintaining the overall quality of the message once it is assembled from the segments that have been automatically recognized with a high confidence rating, but not processed by human agents, and those segments that have been processed by human agents.

Figure 8:
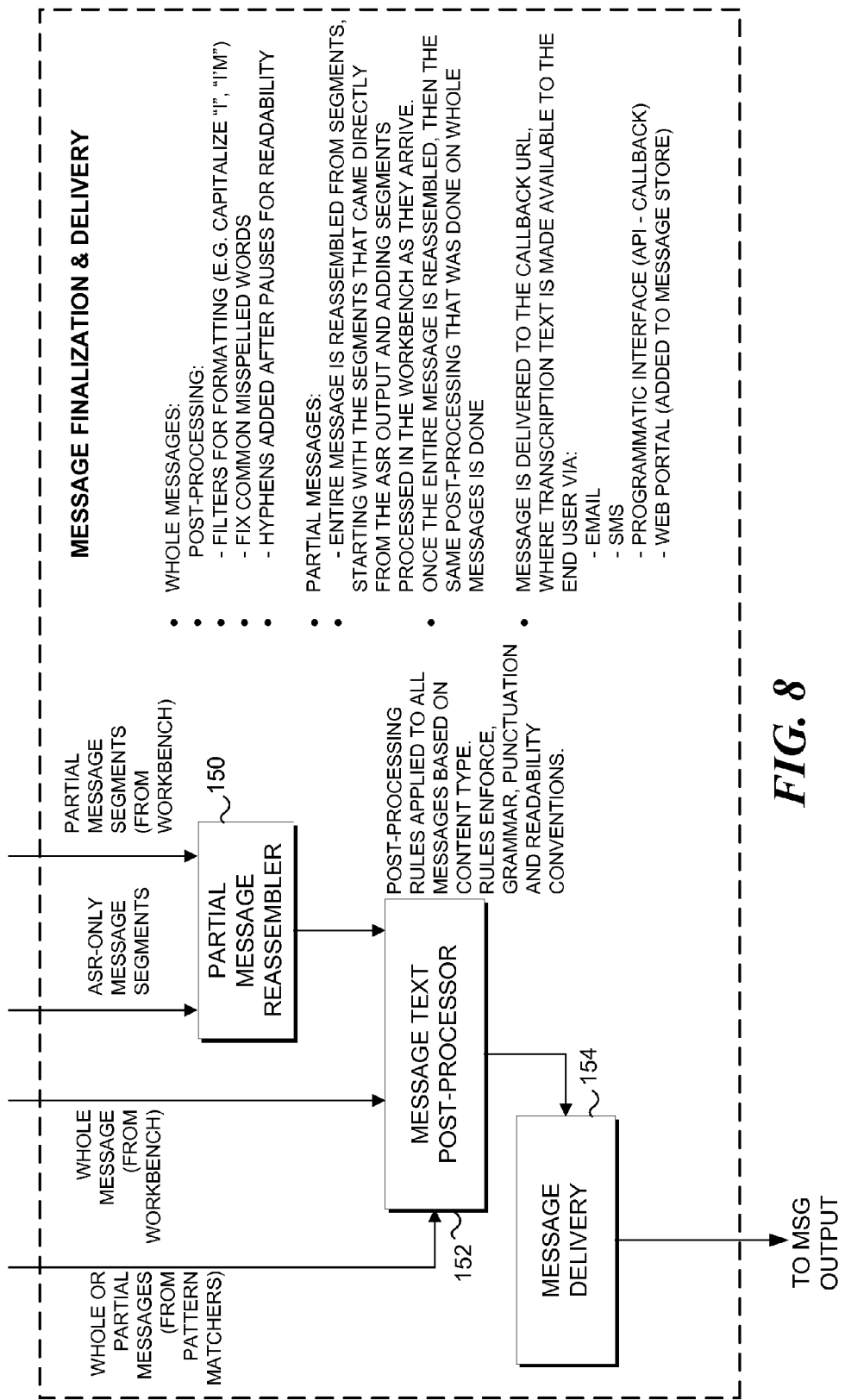
FIG. 8 is a functional flowchart showing further details of the final message finalization and delivery.

FIG. 8 illustrates the steps of the procedure for message finalization and delivery. A partial message reassembler 150 receives automatically recognized text message segments produced by the ASR program and partial message segments that have been processed by one or more human agents. Entire messages are then reassembled from these segments, starting with the segments that were automatically recognized and were produced by the ASR program, and adding segments processed by one or more human agents at one or more workbench stations. Once the entire message has been reassembled in text form, post processing is applied to the whole text message by a message text post processor 152.

Message text post processor 152 receives whole or partial messages produced by the audio content pattern matcher and the text pattern matcher, along with whole messages that have been edited and/or transcribed by a human agent using a workbench station. The post processing applied to reassembled messages and to whole messages includes the application of filters for checking formatting. For example, such filters ensure that the letter "I" is capitalized in the pronoun, and that the word "I'm" is properly capitalized and includes the apostrophe. In addition, post processing corrects commonly misspelled words and adds hyphens within the text, e.g., after pauses in the verbal message to improve readability.

Following post processing, text messages are delivered to the network address specified when the verbal message was received by the service, such as an Internet URL. The text produced by transcribing the verbal message can be made available to an end user via a transmission in an e-mail, through a short message service (SMS) transmission, or supplied to an application program interface (API) as a callback. As a further alternative, the text can be added to a message store through a web portal specified by the URL or other network address that was included with the verbal message originally submitted for transcription.

Figure 9:
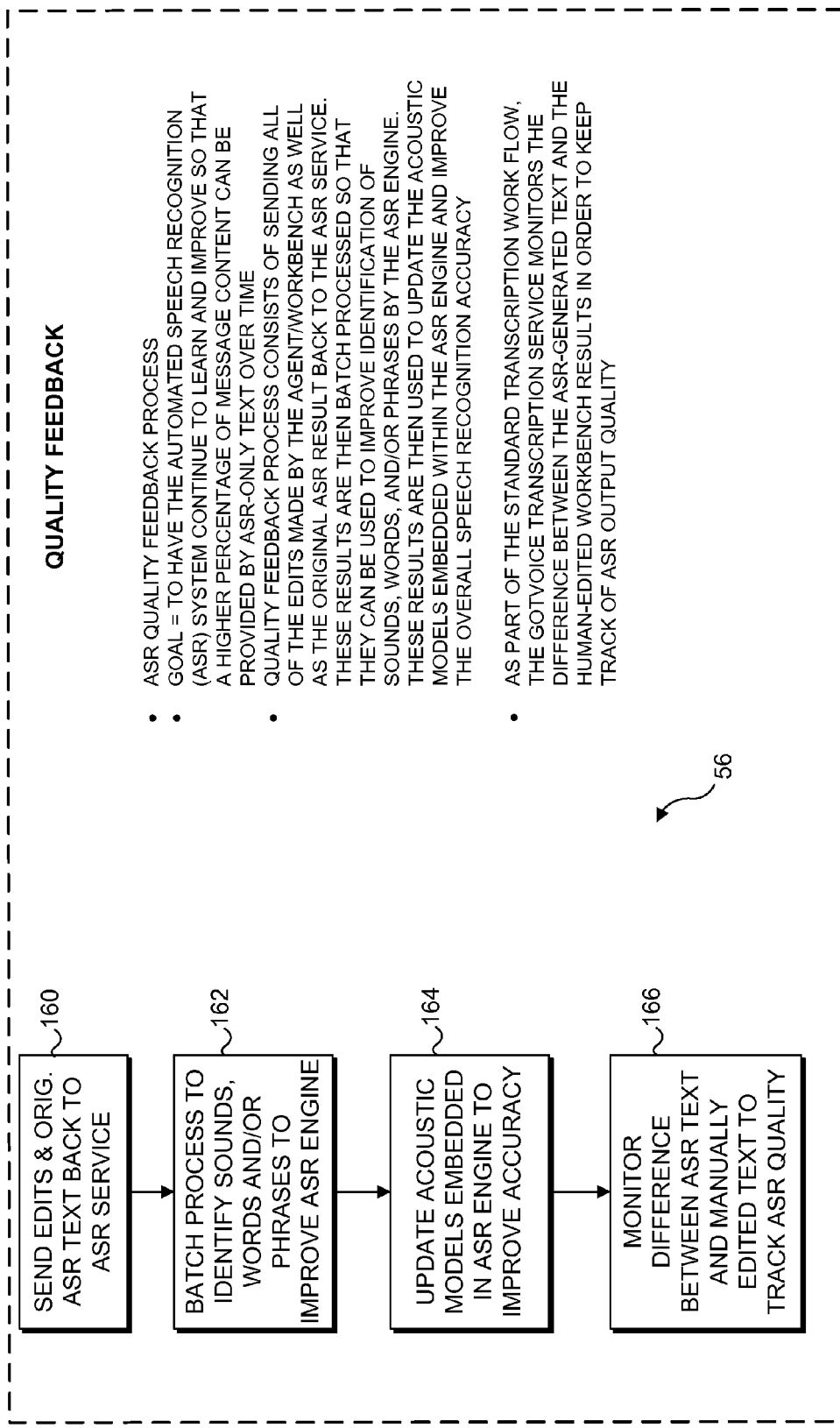
FIG. 9 is a functional flowchart showing further details of the quality feedback process.

It is generally recognized that the accuracy of an ASR program can be improved by providing quality feedback, which is the intention of quality feedback process 56, as illustrated in FIG. 9. In this process, a step 160 provides for sending all of the edits, along with the original automatically recognized text produced by the ASR program, back to the ASR service. A step 162 then batch processes this feedback information to identify sounds, words, and/or phrases that were edited or changed by the human agent in the automatically recognized text, so that these corrections can be employed to improve the accuracy of future speech recognition by the ASR engine. The result of the batch processing step is employed in a step 164 to update the acoustic models that are embedded in the ASR engine, thereby improving its accuracy. A further aspect of this process is implemented in a step 166, which provides for monitoring on a continuing basis the differences between the automatically recognized text and the text that is manually edited by a human agent, so that ASR quality can be continually tracked over time, to ensure that it is not degrading, but is instead, improving.

Figure 10:
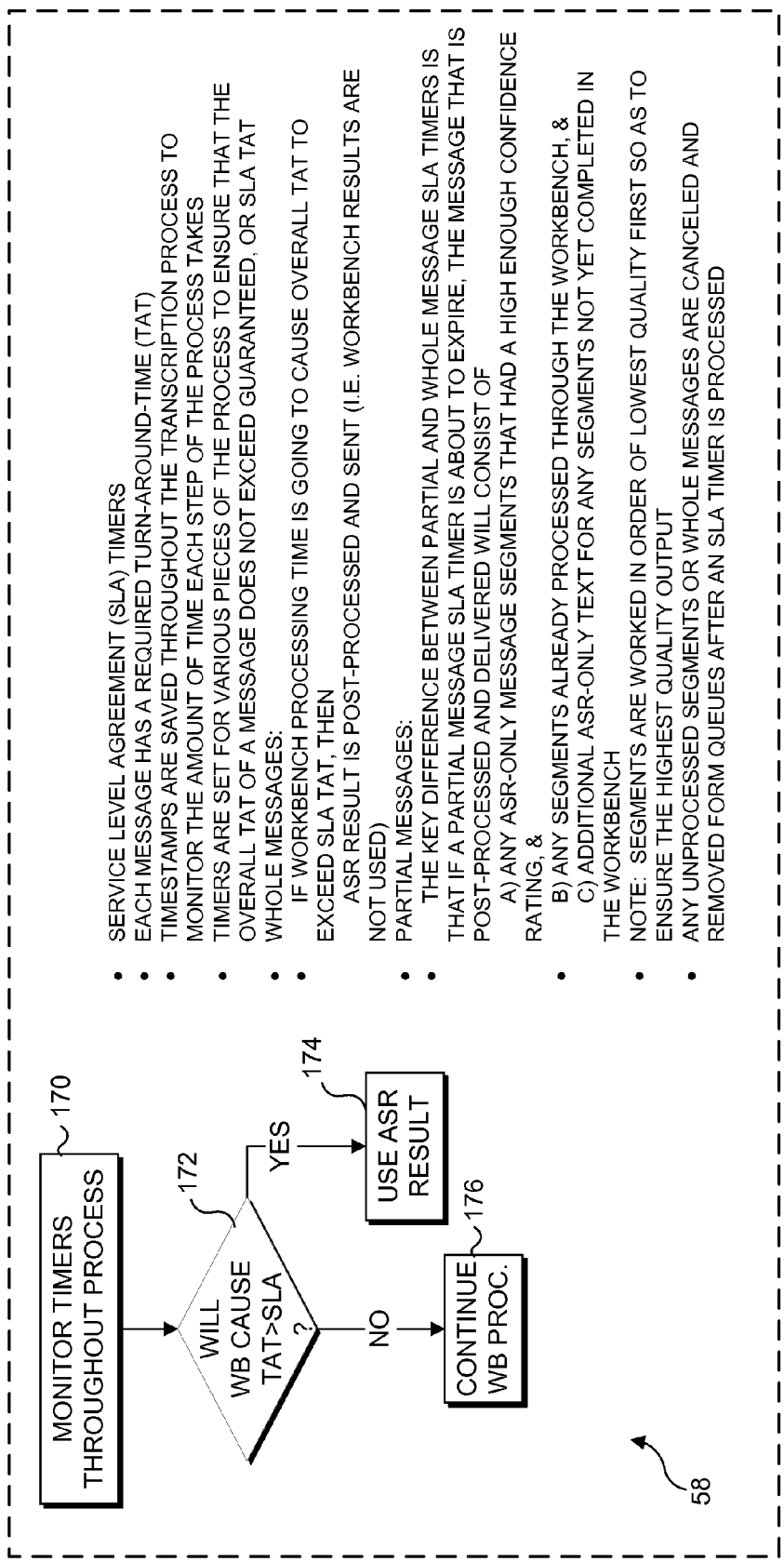
FIG. 10 is a functional flowchart showing further details performed in connection with the SLA timers of FIG. 2.

It should be emphasized that while this exemplary embodiment includes SLA timers 58, these timers are only included to ensure that the processing of verbal messages is completed within time limits that are contractually established in agreements between the parties submitting verbal messages for transcription, and the service. Further details that are employed in connection with this requirement are illustrated in FIG. 10. As provided by a contractual agreement, each verbal message has a required turn-around-time (TAT) in which the transcription of a verbal message into text must be completed. Throughout the process for transcribing the verbal message, timestamps are saved to monitor the amount of time required by each step of the process. Various components of the process are provided with these timers to ensure that the overall TAT for a verbal message does not exceed the guaranteed SLA TAT.

If it appears that the processing of a whole message is going to cause the overall TAT for that verbal message to exceed the SLA TAT, the procedure calls for immediate post processing of automatically recognized text, which will then be transmitted to the end-user. In this case, manual processing by a human agent at a workbench station is not applied to the automatically recognized text, but instead, the automatically recognized text is used as is. If it appears that the SLA TAT time is about to expire for partial message, the text message that is post processed and transmitted to the end user will include: (a) any automatically recognized text message segments having a sufficiently high confidence rating; (b) segments of the message that have already been processed by a human agent at a workbench station; and, (c) any additional automatically recognized text produced by the ASR program, which has not yet been edited by human agent at a workbench station. As noted above, segments of a verbal message are processed by human agents in order starting from those with the lowest quality to those with the highest quality, thereby insuring the high-quality text is provided in the output text message. Any segments or whole messages remaining in a queue after the SLA timer has been processed for that message are removed from the queue.

In summary, a step 170 provides for monitoring the timers for each phase of the transcription process. A decision step 172 determines if further processing by a human agent at a workbench station will cause the TAT to exceed the SLA. If so, a step 174 insures that the automatically recognized text produced by the ASR program will be employed without further human agent editing or transcription. Conversely, a negative result to decision step 172 leads to a step 176, which continues processing by a human agent using a workbench station.

Exemplary Computing Device for Use in the Present System

Figure 11:
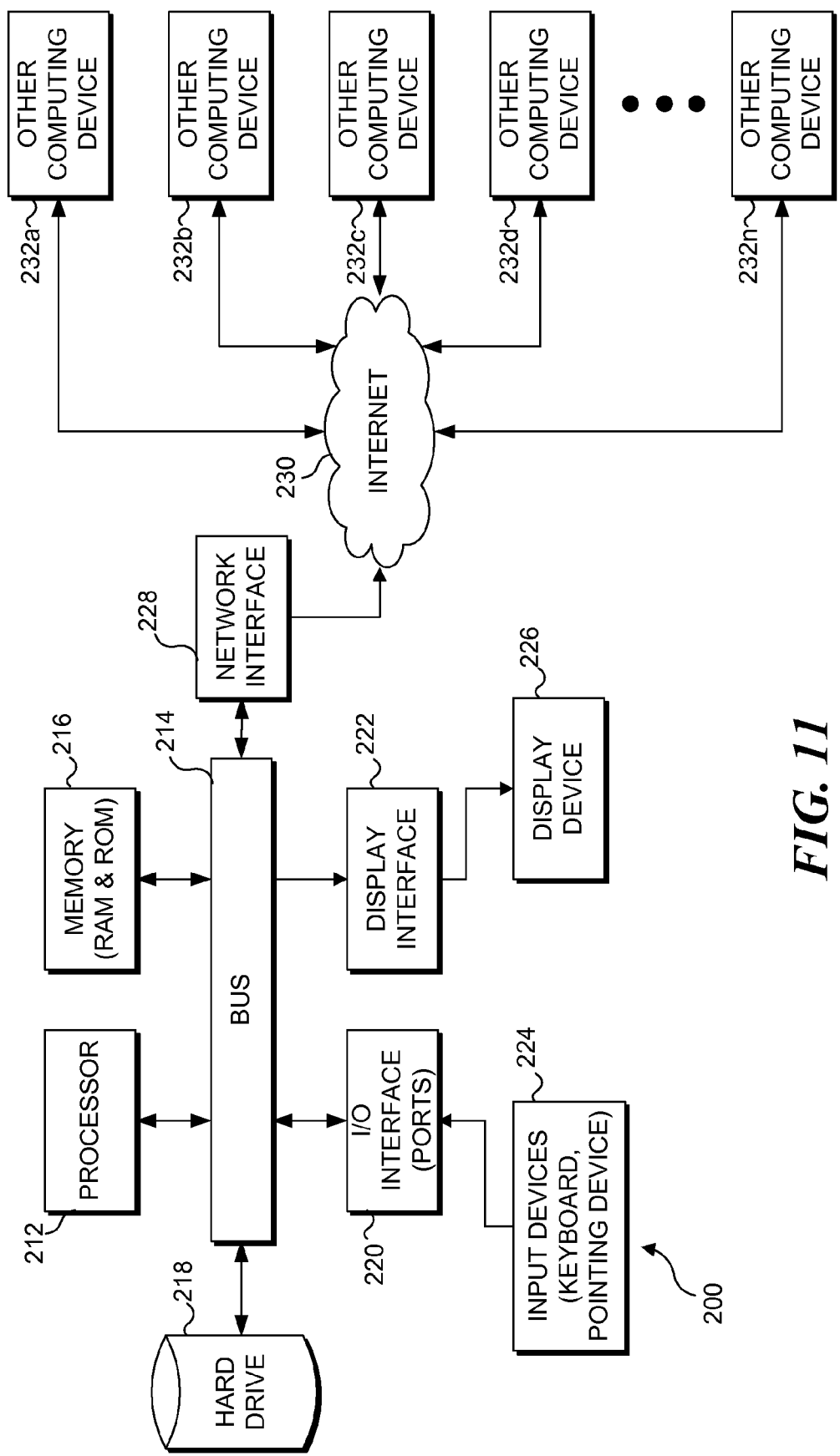
FIG. 11 is a schematic block diagram of an exemplary generally conventional computing device that is suitable for use in carrying out functions performed by various portions of the exemplary system described herein.

FIG. 11 illustrates an exemplary computing system 200 that is suitable for use as a computing device employed for implementing various aspects of the novel approach described above, i.e., for providing efficient transcription of verbal messages to text. Computing system 200 can be employed for carrying out the initial ASR function and for controlling the queuing of verbal messages and parts of messages provided to each workbench, and then reassembling the text portions of the messages produced at a plurality of workstations to produce the output text messages. It will be appreciated that the present approach is very scalable to meet the demand for transcribing verbal messages. For implementing a transcription service that is national or even international in scope, which is certainly reasonable using the data communication capabilities of the Internet, a plurality of computing systems 200 will likely be employed for an exemplary system as described above, and these may be disposed at geographically disparate locations, for example, based upon the cost of providing the specific functions at a location or its proximity to the location of the demand for the transcription services.

It is emphasized that computing system 200 is exemplary and that some of the components described below may not be required or even used in connection with the functions that the computing system provides in the transcription system. In this example, computing system 200 includes a processor 212 that is coupled in communication with a generally conventional data bus 214. Also coupled to the data bus is a memory 216 that includes both random access memory (RAM) and read only memory (ROM). Machine instructions are loaded into memory 216 from storage on a hard drive 218 or from other suitable non-volatile memory, such as an optical disk or other optical or magnetic media. These machine instructions, when executed by processor 212 can carry out a plurality of different functions employed to implement the approach as described herein, as well as other functions.

An input/output (I/O) interface 220 that includes a plurality of different types of ports, such as serial, parallel, universal serial bus, PS/2, and Firewire ports, is coupled to data bus 214 and is in turn connected to one or more input devices 224, such as a keyboard, mouse, or other pointing device, enabling a user to interact with the computing system and to provide input and control the operation of the computing system. A display interface 222 couples a display device 226 to the data bus, enabling a browser program window and other graphic and text information to be displayed for viewing by a user, e.g., if computing system 200 comprises a client computing device. The computing system is coupled to a network and/or to the Internet 230 (or other wide area network) via a network interface 228, which couples to data bus 214. Through the network interface, the computing system is able to access verbal messages that are stored on or provided by other computing devices sites 232a-232n, wherein the subscript "n" on "other computing device 232n" can be a very large number, e.g., indicating that there are potentially many other computing devices in communication with computing system 200 over the Internet (or other network).

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for transcribing verbal messages into text, comprising the steps of:
    receiving verbal messages over a network and queuing the verbal messages in a queue for processing into text;
    automatically processing at least portions of successive verbal messages from the queue with online processors using an automated speech recognition (ASR) program to produce corresponding text;
    assigning whole verbal messages or segments of the verbal messages that have been automatically processed to selected workbench stations for further editing and transcription by operators at the workbench stations;
    enabling the operators at the workbench stations to which the whole or the segments of the verbal messages have been assigned to listen to the verbal messages, correct errors in the text that was produced by the automatic processing, and transcribe portions of the verbal messages that have not been automatically processed by the ASR program, producing final text messages or segments of final text messages corresponding to the verbal messages that were in the queue;
    assembling the segments of the final text messages produced by the operators at the workbench stations from the segments of the verbal messages that were processed as text messages corresponding to the verbal messages that were processed, producing final output text messages; and
    applying post processing to the text corresponding to the verbal messages that were automatically processed, wherein:
        if editing the automatically produced text for one of the automatically processed whole verbal messages by at least one operator on the workbench station will exceed a required turn-around-time, further comprising the step of immediately post processing the automatically produced text without using any edits provided by the operator at the workbench station; and
        if editing the segments of one of the automatically processed verbal messages will exceed the required turn-around-time, further comprising the step of post processing any text of the verbal message that was automatically recognized and has a confidence rating that is greater than a predefined minimum, any text of the automatically processed verbal message that have already been edited or transcribed by one of the operators on the workbench station, and any text of the verbal message that was automatically recognized and was moved into a workbench station queue but has not yet been edited by an operator at a workbench station.

2. The method of claim 1, further comprising the step of validating a format of the verbal messages and a return address for delivery of the output text messages before enabling queuing of each verbal message.

3. The method of claim 1, further comprising the step of assigning the verbal messages to specific online processors in accord with predefined assignment rules.

4. The method of claim 1, wherein the whole verbal messages are simultaneously sent to the online processors for processing using the ASR program and to a queue for processing by one of the workbench stations.

5. The method of claim 1, further comprising the step of separating audio content in at least one of the verbal messages from associated metadata, wherein the associated metadata includes one or more elements selected from the group consisting of:
- proper nouns;
- a caller name, if the verbal message is a voice mail; and
- a name of a person being called, if the verbal message is a voice mail.

6. The method of claim 5, wherein the audio content and the metadata of the verbal messages in the queue are input to the online processors for improving accuracy of the ASR program.

7. The method of claim 1, wherein the step of automatically processing includes the steps of:
- checking for common content patterns in the verbal messages to aid in automated speech recognition; and
- checking automatically recognized speech using a pattern matching technique to identify any common message formats.

8. The method of claim 1, further comprising the step of:
breaking up at least one of the verbal messages into the segments based on predefined rules, including one or more rules selected from the group consisting of:
- breaking the verbal message into the segments where silence is detected;
- breaking the verbal message into the segments so that the segments have a predefined maximum duration; and
- breaking the verbal message into the segments so that the segments have between a predefined minimum and a predefined maximum number of words.

9. The method of claim 8, further comprising the steps of:
assigning confidence ratings to the segments of the verbal messages that were automatically recognized by the ASR program;
assigning at least one of the verbal messages, the automatically recognized text, a timeline for the verbal message, and the confidence ratings of the segments to a workbench partial message queue; and
withholding the segments that have a confidence rating above a predefined level from the workbench partial message queue, based on a high probability that the automatically recognized text is correct.

10. The method of claim 1, wherein the step of assigning the whole verbal messages or the segments of verbal messages comprises the steps of:
- assigning the whole verbal messages or the segments of verbal messages to a specific workbench station used by the operator eligible to process verbal messages of that type; and
- assigning the segments of verbal messages having a lower quality to workbench stations first to ensure said segments are transcribed with a highest quality, in a time allotted to process each of the verbal messages.

11. The method of claim 1, wherein the operators at the workbench stations edit and control transcription of the verbal messages in a browsing program display, and wherein transcription of the whole verbal messages is selectively carried out in one of three modes, including:
- a word mode that includes keyboard inputs for specific transcription inputs;
- a line mode that facilitates looping through an audible portion of at least one of the whole verbal messages to focus on a single line of transcribed text at a time; and
- a whole message mode, in which the operator working at the workbench station listens to the whole verbal message to produce the corresponding text.

12. The method of claim 11, wherein transcription of the portions of the one or more verbal messages is carried out by one of the operators at the workbench station, and further comprising the step of displaying a graphical representation of an audio waveform for at least a part of the verbal message to the operator, with the portions to be transcribed visually indicated.

13. The method of claim 1, further comprising the step of applying post processing to the text corresponding to the verbal messages that were transcribed, for correcting minor errors in the text.

14. The method of claim 1, wherein the step of producing the final output text messages comprises the steps of making the final output text messages available to an end user by transmitting the final output text messages to the end user in connection with one of:
- an email message transmitted over the network;
- a short message service message transmitted over the network and through a telephone system;
- a file transmitted over the network to a program interface; and
- a file transmitted over the network to a web portal.

15. The method of claim 1, further comprising the step of employing the edits made to the text produced by the ASR program by operators at the workbench stations, as feedback used to improve an accuracy of the ASR program.

16. The method of claim 1, further comprising the steps of:
- determining a confidence level for the portions of the verbal messages recognized by the ASR program, the confidence level being indicative of a likely accuracy of the text output by the ASR program;
- giving priority to assigning the portions of the verbal messages and the corresponding text that were automatically recognized having a lower confidence level to the operators at the workbench stations for editing over the portions of the verbal messages and the corresponding text that were automatically recognized having a higher confidence level, so that more of the difficult portions of the verbal messages will be edited and transcribed by the operators, compared to easier portions;
- assessing a demand for transcribing the verbal messages to determine a transcribing load on available operators at the workbench stations; and
- varying a percentage of the final output text messages that comprises only the automatically recognized text, relative to a remaining percentage that is output by the operators as a function of the load, so that a growing backlog of the verbal messages to be transcribed is avoided by using a greater percentage of the automatically recognized text for the final output text messages, as the load increases.

17. A system for efficiently transcribing verbal messages that are provided to the system over a network, to produce corresponding text, comprising:
- a plurality of processors coupled to the network, for receiving and processing verbal messages to be transcribed to text;
- one or more of the plurality of processors processing the verbal messages using an automatic speech recognition (ASR) program to produce automatically recognized text;
- one or more of the plurality of processors on corresponding one or more workbench stations each providing a graphical interface on a display to enable operators using the one or more workbench stations to review and edit the automatically recognized text, and to further transcribe the verbal messages to produce the edited text; and one or more of the plurality of processors reassembling the edited text, producing final output text messages that can be conveyed to an end user, wherein the one or more of the plurality of processors apply post processing to the automatically recognized text before producing the final output text messages corresponding to the verbal messages that were processed using the ASR program:

if editing the automatically recognized text for a whole verbal message by one of the operators on the workbench station will exceed a required turn-around-time, the automatically recognized text is submitted for post processing without using any edits provided by the operator at the workbench station; and if editing segments of at least one of the processed verbal messages will exceed the required turn-around-time, then immediately submitting for post processing:

any of the segments of the processed verbal message that were automatically recognized and that have a confidence rating that is greater than a predefined minimum;

any of the segments of the processed verbal message that have already been edited or transcribed by one of the operators on the workbench station; and any of the segments of the processed verbal message that were moved into a workbench station queue but have not yet been edited by one of the operators at the workbench station.

18. The system of claim 17, wherein the one or more of the plurality of processors receive the verbal messages transmitted over the network and assign the verbal messages received to others of the plurality of processors based on predefined assignment rules.

19. The system of claim 18, wherein the one or more of the plurality of processors validate an audio format and check for a return address to a location on the network for each of the verbal messages that have been received, terminate processing of any verbal message that has an invalid audio format or lacks a return address, queue the verbal messages that are found to have a valid audio format in a new verbal message queue, and assign the verbal messages in the new verbal message queue to one or more of the others of the plurality of processors based on at least one of:

a content type of the verbal messages;
an availability of the other processors; and
a priority level of the verbal messages.

20. The system of claim 17, wherein the one or more of the plurality of processors input the verbal messages to the ASR program and also add the verbal messages to a workbench queue for manual processing by the one or more operators.

21. The system of claim 17, wherein the one or more of the plurality of processors identify patterns in the verbal messages and in the automatically recognized text to determine a confidence rating for the segments of the verbal messages.

22. The system of claim 21, wherein if the confidence rating for one of the segments is above a predefined level, the one or more of the plurality of processors do not submit the segment for further processing by one of the operators at the workbench station, but instead submit the segment for final assembly into an edited text message.

23. The system of claim 21, wherein the one or more of the plurality of processors break up at least one of the verbal messages into the segments based on predefined rules, including one or more predefined rules selected from the group consisting of:

breaking the verbal message into successive segments at points in the verbal message where silence is detected between the successive segments;

breaking the verbal message into the segments so that the segments have a predefined maximum duration; and breaking the verbal message into the segments so that the segments have between a predefined minimum and a predefined maximum number of words.

24. The system of claim 17, wherein the ASR program is provided input of both audio data and metadata comprising the verbal messages, to improve an accuracy with which the text is automatically recognized when processing the verbal messages with the ASR program.

25. The system of claim 24, wherein the metadata for each verbal message includes at least one or more elements selected from the group consisting of:

proper nouns;
a caller name, if the verbal message is a voice mail; and
a name of a person being called, if the verbal message is a voice mail.

26. The system of claim 17, wherein the segments of one or more of the verbal messages having a lower quality are assigned to the workbench stations for editing and transcription by the operators before the segments having a higher quality, to ensure the segments having lower quality are manually transcribed to achieve greater accuracy, in a time allotted to transcribe each of the verbal messages, and wherein different segments of the verbal message may be assigned to different workbench stations for editing and transcription by a plurality of different operators.

27. The system of claim 17, wherein the workbench station includes a display on which a graphical representation of an audio waveform is displayed for at least a part of one or more of the verbal messages to be transcribed by one of the operators of the workbench station, with the segment of the verbal message to be transcribed visually indicated.

28. The system of claim 17, wherein the one or more processors apply post processing to the text before producing the output text corresponding to the verbal messages that were transcribed, for correcting minor errors in the text.

29. The system of claim 17, wherein the final output text messages are made available to an end user by transmitting the final output text messages to the end user in connection with one of:

an email message transmitted over the network;
a short message service message transmitted over the network and through a telephone system;
a file transmitted over the network to a program interface; and
a file transmitted over the network to a web portal.

30. The system of claim 17, wherein the edits made by the operators at the workbench stations to the automatically recognized text produced by the ASR program are employed as feedback for use in improving an accuracy of the ASR program.

31. The system of claim 17, wherein:

a confidence level is determined for portions of the verbal messages recognized by the ASR program, the confidence level being indicative of a likely accuracy of the text output by the ASR program;

priority is given to assigning the segments of the verbal messages and the automatically recognized text having a lower confidence level to the operators at the workbench stations for editing over the segments of the verbal messages and the text that were automatically recognized having a higher confidence level, so that more of the difficult segments of the verbal messages will be edited and transcribed by the operators, compared to easier portions;

a current demand for transcribing the verbal message is assessed to determine a transcribing load on available operators at the workbench stations; and varying a percentage of the final output text messages that comprise only the automatically recognized text, relative to a remaining percentage that is output by the operators as a function of the load, so that a growing backlog of the verbal messages to be transcribed by the system is avoided by using a greater percentage of the automatically recognized text for the final output text messages, as the load increases.

* * * * *